United States Patent
Moulsley et al.

(10) Patent No.: US 9,801,167 B2
(45) Date of Patent: Oct. 24, 2017

(54) CHANNEL STATE FEEDBACK FOR MULTI-CELL MIMO

(71) Applicant: FUJITSU LIMITED, Kawasaki-shi, Kanagawa (JP)

(72) Inventors: Timothy Moulsley, Caterham (GB); Hui Xiao, West Drayton (GB); Luciano Pietro Giacomo Sarperi, Bern (CH)

(73) Assignee: FUJITSU LIMITED, Kawasaki (JP)

( * ) Notice: Subject to any disclaimer, the term of this patent is extended or adjusted under 35 U.S.C. 154(b) by 235 days.

(21) Appl. No.: 13/765,258

(22) Filed: Feb. 12, 2013

(65) Prior Publication Data

US 2013/0148611 A1 Jun. 13, 2013

Related U.S. Application Data

(63) Continuation of application No. PCT/EP2010/062969, filed on Sep. 3, 2010.

(51) Int. Cl.
*H04W 72/00* (2009.01)
*H04W 72/04* (2009.01)
(Continued)

(52) U.S. Cl.
CPC .......... *H04W 72/042* (2013.01); *H04B 7/024* (2013.01); *H04B 7/0417* (2013.01);
(Continued)

(58) Field of Classification Search
None
See application file for complete search history.

(56) References Cited

U.S. PATENT DOCUMENTS

2003/0092456 A1* 5/2003 Dent .............................. 455/503
2003/0123396 A1* 7/2003 Seo et al. ...................... 370/252
(Continued)

FOREIGN PATENT DOCUMENTS

| CN | 101637044 A | 1/2010 |
|---|---|---|
| CN | 101663907 A | 3/2010 |

(Continued)

OTHER PUBLICATIONS

Fujitsu, "Aperiodic CQI reporting for multiple DL component carriers", Agenda Item: 6.2.5, Aug. 23-27, 2010, R1-104958, 3GPP TSG-RAN WG1 Meeting #62, Madrid, Spain.
(Continued)

*Primary Examiner* — Hassan Phillips
*Assistant Examiner* — Gautam Sharma
(74) *Attorney, Agent, or Firm* — Myers Wolin, LLC

(57) ABSTRACT

Disclosed is a method for use in a multiple-input multiple-output (MIMO) communication network in which the network includes a plurality of cells provided by one or more base stations operable to transmit signals on at least one downlink to, and receive signals on at least one uplink from, one or more user equipments. A user equipment feeds back to the network reports on channel state information, CSI, relating to one or more channels between base stations and that user equipment, and base stations adapt downlink signals to user equipments based on the CSI reports, the method including: identifying uplink resources for a user equipment-initiated channel state message; the user equipment judging a need for a user equipment-initiated channel state message based on information not available to the network; and the user equipment sending the user equipment-initiated channel state message to the network using the uplink resources identified.

13 Claims, 7 Drawing Sheets

(51) Int. Cl.
*H04B 7/024* (2017.01)
*H04B 7/0417* (2017.01)
*H04B 7/06* (2006.01)

(52) U.S. Cl.
CPC ......... *H04B 7/0645* (2013.01); *H04B 7/0626* (2013.01); *H04B 7/0658* (2013.01)

(56) References Cited

U.S. PATENT DOCUMENTS

| | | | |
|---|---|---|---|
| 2005/0201296 A1* | 9/2005 | Vannithamby et al. | 370/241 |
| 2006/0018250 A1* | 1/2006 | Gu et al. | 370/208 |
| 2006/0079221 A1* | 4/2006 | Grant et al. | 455/423 |
| 2006/0256805 A1* | 11/2006 | Cho et al. | 370/431 |
| 2007/0047498 A1* | 3/2007 | Zhang et al. | 370/335 |
| 2007/0097914 A1* | 5/2007 | Grilli et al. | 370/329 |
| 2008/0026744 A1* | 1/2008 | Frederiksen et al. | 455/425 |
| 2008/0084844 A1* | 4/2008 | Reznik et al. | 370/330 |
| 2008/0214193 A1* | 9/2008 | Jeong et al. | 455/436 |
| 2008/0242332 A1* | 10/2008 | Suh et al. | 455/517 |
| 2009/0010319 A1* | 1/2009 | Sun et al. | 375/224 |
| 2009/0163144 A1* | 6/2009 | Nakatsugawa | H04W 24/10 455/67.13 |
| 2009/0274050 A1* | 11/2009 | Johansson et al. | 370/236 |
| 2010/0039951 A1 | 2/2010 | She et al. | |
| 2010/0113078 A1* | 5/2010 | Farajidana et al. | 455/507 |
| 2010/0296472 A1* | 11/2010 | Lee et al. | 370/329 |
| 2012/0213111 A1* | 8/2012 | Shimezawa | H04B 7/063 370/252 |

FOREIGN PATENT DOCUMENTS

| | | |
|---|---|---|
| EP | 2337235 | 6/2011 |
| JP | 2008-060824 A | 3/2008 |
| JP | 2010-45783 A | 2/2010 |
| WO | 2008/047646 A1 | 4/2008 |
| WO | 2009/033358 A1 | 3/2009 |
| WO | 2009/074880 A2 | 6/2009 |
| WO | 2010/048429 A2 | 4/2010 |
| WO | 2011/044526 A1 | 4/2011 |

OTHER PUBLICATIONS

Office Action issued for corresponding Japanese Patent Application No. 2013-526325, mailed Feb. 4, 2014, with an English translation.
Notification of Reasons for Rejection issued for corresponding Japanese Patent Application No. 2013-526325, mailed on Sep. 24, 2014, with an English translation.
Notification of the First Office Action issued for corresponding Chinese Patent Application No. 201080068916.0 dated Oct. 28, 2014 with an English translation.
International search report issued for corresponding International Patent Application No. PCT/EP2010/062969, mailed Jun. 7, 2011.
Huawei; "Feedback capacity analysis for different feedback mechanisms"; Agenda Item: 15.2; 3GPP TSG RAN WG1 Meeting #57bis; R1-092366; Los Angeles, USA; Jun. 29-Jul. 3, 2009.
Huawei; "Downlink CoMP JP Evaluation and Feedback design"; Agenda Item: 15.2; 3GPP TSG RAN WG1 Meeting #58; R1-093038; Shenzhen, P.R. China; Aug. 24-28, 2009.
3GPP TR 36.814 V0.4.1; 3rd Generation Partnership Project; Technical Specification Group Radio Access Network; "Further Advancements for E-UTRA Physical Layer Aspects (Release 9)"; Feb. 2009.
Markus Herdin; "Correlation Matrix Distance, a Meaningful Measure for Evaluation of Non-Stationary MIMO Channels"; Wireless Solution Laboratory; DoCoMo Communications Laboratories Europe GmbH; Munich, Germany 2005.

* cited by examiner (a) CoMP JP (b) CoMP CS/CB

Downlink    Uplink

CHANNEL STATE FEEDBACK FOR MULTI-CELL MIMO

CROSS-REFERENCE TO RELATED APPLICATIONS

The present application is a continuation of PCT Application No. PCT/EP2010/062969, filed on Sep. 3, 2010, the contents of which are herein wholly incorporated for reference.

FIELD OF THE INVENTION

The present invention relates to wireless communication systems, and in particular to multi-cell multiple-input multiple-output ("MIMO") systems in which there is coordination of transmissions between cells, for example systems compliant with the 3GPP Long Term Evolution (LTE), 3GPP LTE-A, IEEE 802.16 and 802.11 groups of standards.

BACKGROUND OF THE INVENTION

Wireless communication systems are widely known in which base stations (BSs) communicate with user equipments (UEs) (also called subscriber or mobile stations) within range of the BSs.

The geographical area covered by one or more base stations is generally referred to as a cell, and typically many BSs are provided in appropriate locations so as to form a network covering a wide geographical area more or less seamlessly with adjacent and/or overlapping cells. (In this specification, the terms "system" and "network" are used synonymously). Each BS divides its available bandwidth, i.e. frequency and time resources, into individual resource allocations for the user equipments. There is a constant need to increase the capacity of such systems, and to improve the efficiency of resource utilisation, in order to accommodate more users, more data-intensive services and/or higher data transmission rates.

OFDM (Orthogonal Frequency Division Multiplexing) is one known technique for transmitting data in a wireless communication system. An OFDM-based communications scheme divides data symbols to be transmitted among a large number of subcarriers, hence the term frequency division multiplexing. Data is modulated onto a subcarrier by adjusting its phase, amplitude, or both phase and amplitude. The "orthogonal" part of the name OFDM refers to the fact that the spacings of the subcarriers in the frequency domain are specially chosen so as to be orthogonal, in a mathematical sense, to the other subcarriers. In other words, they are arranged along the frequency axis such that the sidebands of adjacent subcarriers are allowed to overlap but can still be received without inter-subcarrier interference. In mathematical terms, the sinusoidal waveforms of each subcarrier are called eigenfunctions of a linear channel, with the peak of each sinusoid coinciding with a null of every other sinusoid. This can be achieved by making the subcarrier spacing a multiple of the reciprocal of the symbol period.

When individual subcarriers or sets of subcarriers are assigned to different user equipments, the result is a multi-access system referred to as OFDMA (Orthogonal Frequency Division Multiple Access). The term OFDM as used in the art is often intended to include OFDMA. The two terms may therefore be considered interchangeable for the purposes of the present explanation. By assigning distinct frequency/time resources to each user equipment in a cell, OFDMA can substantially avoid interference among the users within a given cell.

In a wireless communication system such as LTE, data for transmission on the downlink is organised in OFDMA frames each divided into a number of subframes. Various frame types are possible and differ between FDD and TDD for example.

Meanwhile, on the uplink, in view of the relatively unfavourable PAPR (peak-to-average-power ratio) properties of ODMA, an alternative scheme called SC-FDMA (Single Carrier Frequency Division Multiple Access) is used in LTE, which allows a better balance between uplink range and UE amplifier cost. In an SC-FDMA signal, each subcarrier used for transmission contains information of all the transmitted symbols whereas individual subcarriers of an OFDMA signal carry only information on specific symbols.

A technique called MIMO, where MIMO stands for multiple-input multiple-output, has been adopted in several commercial wireless systems including LTE due to its spectral efficiency gain, spatial diversity gain and antenna gain. This type of scheme employs multiple antennas at the transmitter and/or at the receiver (often at both) to enhance the data capacity achievable between the transmitter and the receiver. Typically, this is used to achieve an enhanced data capacity between one or more BSs and the UEs served by the BSs.

By way of example, a 2×2 MIMO configuration contains two antennas at the transmitter and two antennas at the receiver. Likewise, a 4×4 MIMO configuration contains four antennas at the transmitter and four antennas at the receiver. There is no need for the transmitter and receiver to employ the same number of antennas. Typically, a BS in a wireless communication system will be equipped with many more antennas in comparison with a UE (such as, for example, a mobile handset), owing to differences in power, cost and size limitations.

The term channel is used to describe the frequency (or equivalently time delay) response of the radio link between a transmitter and a receiver. The so-called MIMO channel (or "channel") contains all the subcarriers (see the discussion on subcarriers above), and covers the whole bandwidth of transmission. A MIMO channel contains many individual radio links. The number of these individual radio links, which may be individually referred to as single-input single-output (SISO) channels (also called sub-channels), is $N_r \times N_T$, where $N_T$ is the number of antennas at the transmitter and $N_r$ is the number of antennas at the receiver. For example, a 3×2 MIMO arrangement contains 6 links, hence it has 6 SISO channels.

Considering the simplified 2×3 MIMO system schematically represented in FIG. 1, it can be seen that antenna R0 of receiver R receives transmissions from each of the transmitter antennas T0, T1 and T2 of transmitter T. Similarly, receiver antenna R1 receives transmissions from transmitter antennas T0, T1 and T2. Therefore, the signal received at the receiver comprises (or is made up of) a combination of the transmissions (i.e. of the SISO channels) from the transmitter antennas. In general, SISO channels can be combined in various ways to transmit one or more data streams to the receiver.

The number of simultaneously transmitted streams the MIMO channel can support is commonly referred to as the "channel rank", and the number of streams actually transmitted is referred to as "transmission rank". The transmission rank typically needs to be adapted to suit the current channel characteristics and hence avoid excessive inter-
} stream interference. A more general definition of transmission rank is the number of complex-valued independent modulation symbols transmitted per time-frequency resource.

FIG. 2 is a conceptual diagram of a more generalized MIMO system. In FIG. 2, a transmitter transmits signals utilizing $N_T$ transmitting antennas, and a receiver receives the signals from the transmitter utilizing $N_r$ receiving antennas. In order to create a mathematical model of the characteristics of the overall MIMO channel, it is necessary to represent the individual SISO channels between the transmitter and receiver. As shown in FIG. 2, the individual SISO channels are represented by $H_{0,0}$ to $H_{N_r-1,N_T-1}$, and as suggested in the Figure, these form terms of a matrix commonly called the channel matrix or channel response matrix H. It will be recognised that $H_{0,0}$ represents the channel characteristics (for example, channel frequency response) for transmitting signals from the transmitting antenna 0 to the receiving antenna 0. Similarly, "$H_{N_r-1,N_T-1}$" represents the channel characteristics for transmitting signals from the transmitting antenna $N_T-1$ to the receiving antenna $N_r-1$, and so on.

In FIG. 2, the symbols $x_0$ to $x_{N_T-1}$, which represent the signal elements transmitted using the transmitting antennas 0 to $N_T-1$, together form a transmitted signal vector $\underline{x}$ (i.e. $\underline{x}=(x_0,x_1,x_2,\ldots,x_{N_T-1})^T$), where $(\ )^T$ indicates the vector transpose. Likewise, the received signals elements $y_0$ to $y_{N_r-1}$ received by receiving antennas 0 to $N_r-1$ together form a received signal vector $\underline{y}$ (i.e. $\underline{y}=(y_0,y_1,y_2,\ldots,y_{N_r-1})^T$). The relationship between the vectors $\underline{y}$ and $\underline{x}$ for the simplified system shown in FIG. 2 (and also that shown in FIG. 3) may be modelled by the basic MIMO system equation:

$$\underline{y}=H\underline{x}+\underline{n} \qquad (I)$$

where H is the channel matrix described above and $\underline{n}$ is a vector representing noise. Noise elements $n_0$ to $n_{N_r-1}$ are illustrated in FIG. 2 and represent noise in the respective received signal elements $y_0$ to $y_{N_r-1}$. Hence, the noise vector n is given by $\underline{n}=(n_0,n_1,n_2,\ldots,n_{N_r-1})^T$.

It should be noted that, despite the name "multiple-input multiple-output", MIMO systems can operate even if one of the transmitter and the receiver has only one antenna (i.e. even if $N_T=1$ or $N_r=1$).

MIMO transmission schemes may be described as "non-adaptive" and "adaptive". In the non-adaptive case, the transmitter does not have any knowledge of the channel properties and this limits performance, as it cannot take account of changes in conditions which cause changes in the state of the channel. Adaptive schemes rely on channel knowledge which may be obtained, for example, by feedback of information (channel-state information or CSI) from the receiver to the transmitter, allowing modification of the transmitted signal to account for changing conditions and to maximise data throughput. Adaptive MIMO schemes may be further described as "closed-loop" (i.e. operating with the benefit of channel state feedback) or "open-loop" (i.e. without channel state feedback). A combination is possible in the sense that the scheme may be "closed-loop" with respect to some aspects (e.g. feedback of received power") and "open-loop" with respect to other aspects (e.g. no feedback related to the channel matrix). The present invention is concerned primarily with closed-loop MIMO schemes.

The feedback just described is important, in particular, in so called FDD (Frequency Division Duplex) systems, where uplink transmissions (i.e. transmissions from user equipment to base station) and downlink transmissions (vice-versa) employ two different carrier frequencies. Because of the frequency change, the uplink and downlink channels are different and CSI needs to be fed back in order to provide an adaptive scheme; in particular so that the transmitter can perform so-called "link adaptation" in order to account for channel variations (such as changes in the channel state) when transmitting signals. On the other hand, in so-called TDD (Time Division Duplex) systems, the uplink and downlink are transmitted in two adjacent time slots on the same frequency. The two time slots are generally within the channel coherence time, meaning that it can be reasonably (e.g. with the same antennas used in the uplink and downlink directions) assumed that the channel state does not change, so information relating to the channel matrix need not be fed back. The transmitter can estimate the channel from the received signal on the reverse link, usually aided by the insertion of pilots or known waveforms by the transmitter into the signal sent on the reverse link. This is often referred to as "uplink sounding". However, it may not always be desirable to incur the overhead of uplink sounding, in which case closed-loop techniques offer an alternative.

FIG. 3 is a diagram representing a MIMO system similar to that shown in FIG. 1, but more generalised. MIMO system 1 comprises a transmitter 2 which comprises a plurality of transmitting antennas (0), (1), . . . , ($N_T-1$) and a receiver 3 which comprises a plurality of receiving antennas (0), (1), . . . , ($N_r-1$). The transmitter 2 transmits symbols 0, 1, . . . , $N_T-1$ using the $N_T$ transmitting antennas. The symbols can be created from one data stream, referred to as vertical encoding, or different data streams, referred to as horizontal encoding. In addition, each transmitted symbol corresponds to, for example, one-bit data if the modulation method is binary phase-shift keying (BPSK), or corresponds to two-bit data if the modulation method is quadrature phase-shift keying (QPSK). These concepts will be familiar to those skilled in the art. The receiver 3 receives the signals transmitted from the transmitter 2 using the $N_r$ receiving antennas, and it comprises a signal regeneration unit 4 which regenerates the transmitted symbols from the signals received.

As indicated by the arrows in FIG. 3, the signals transmitted from a plurality of the transmitting antennas are received by a plurality of receiving antennas, giving rise to $N_r \times N_T$ possible subchannels in total. In other words, the signals transmitted from the transmitting antenna (0) are received by receiving antennas (0) through ($N_r-1$), the signals transmitted from the transmitting antenna (1) are received by receiving antennas (0) through ($N_r-1$), etc. The characteristics of the subchannel which propagates the signals from the i-th transmitting antenna to the j-th receiving antenna are expressed as "$H_{ji}$" and form one component term of the $N_r \times N_T$ channel matrix H.

The maximum number of independent data streams that can be usefully transmitted in parallel over the MIMO channel is given by the lower of $N_T$ and $N_r$ and is further limited by the rank of the matrix H. The transmission quality depends on the matrix H and, for example, degrades significantly in case the singular values of the matrix are not sufficiently strong, such as where antennas are not sufficiently de-correlated, for example in an environment with little scattering or when antennas are physically close together.

In LTE, up to 2 code words can be mapped onto different so-called layers. The number of layers for transmission is typically chosen to be less than or equal to the rank of the matrix H, and there is a fixed mapping between code words to layers. Precoding on the transmitter side can be achieved by applying a precoding matrix W to the signal before transmission. The optimum available precoding matrix W is selected from a predefined "codebook", which is known at both the base station(s) and UE side. The UE selects the optimum available precoding matrix (the one offering the highest data rate) based on its knowledge of the channel, and indicates its preferred precoding matrix to the transmitter side, via a precoding matrix index (PMI) for example. PMI is one kind of channel state information (CSI) mentioned earlier. Note that in LTE, while the precoder used at the BS is likely to be designed on the basis of the UE feedback, this precoder is not necessarily restricted to be one of codebook entries.

By way of further background explanation, a MIMO-OFDM transmitter and a MIMO-OFDM receiver will be briefly outlined with reference to FIGS. 4 and 5 respectively. In the OFDM transmitter schematically shown in FIG. 4, high-speed binary data is encoded (convolutional code is an example), interleaved, and modulated (using a modulation scheme such as BPSK, QPSK, 64QAM, and the like). Independent channel encoders may be used for each transmitting antenna. Subsequently, the data is converted into parallel low-speed modulated data streams which are fed to M subcarriers. The output from each encoder is carried separately on a plurality of subcarriers. The modulated signals are frequency-division multiplexed by M-point Inverse Fast Fourier Transform (IFFT) and the guard interval is added. The resulting OFDM signal is converted into an analog signal by a D/A converter and is upconverted into RF band and transmitted over the air.

At the MIMO-OFDM receiver schematically shown in FIG. 5, the received signals from the $N_r$ receiver antennas are filtered by a band pass filter (BPF), and then down-converted to a lower frequency. The down-converted signal is sampled by ND converter (namely, converted into a digital signal), and the guard interval is removed before the sampled data is fed to the M-point Fast Fourier Transformer (FFT). After Fourier transformation is performed on each of the signals received through the $N_r$ receiver antennas, they are fed to the MIMO signal processing unit 11. The MIMO signal processing unit 11 comprises the signal regeneration unit 4 (as shown in FIG. 3) which performs processing to compensate for the channel characteristics.

It should be noted that, for the purposes of explanation, the above discussion focused mainly on the case of a single transmitter sending MIMO signals to a single receiver or in other words to a set of antennas in one location (so-called Single User or SU-MIMO), but of course practical MIMO wireless communication systems are generally much more elaborate than this, providing many mutually adjacent cells in which base stations transmit over respective MIMO channels to one or more UEs simultaneously. In fact, the present invention is largely directed at these more elaborate systems, and issues associated with them, as discussed below. The term Multi-User MIMO or MU-MIMO refers to techniques which rely on precoding to exploit the geographical separation of users' respective antennas, allowing signals to be transmitted to and received from a plurality of user equipments in the same frequency band simultaneously.

As explained above, the means by which frequency resources are utilised in conventional MIMO schemes prevents or significantly limits interference among user equipments within a given cell. In other words, intra-cell interference is substantially avoided. However, in the more elaborate multi-cellular networks discussed in the previous paragraph, the benefits of MIMO transmission can often be limited by inter-cell interference.

Inter-cell interference may arise, for example, because the frequency resources (i.e. the carriers and subcarriers) utilised by base stations in transmitting data to user equipments in one cell are identical to the frequency resources utilised by base stations in transmitting data to user equipments in an adjacent cell. In other words, in the kinds of wireless communication systems in which the present invention may find use, there is likely to be, using terminology common in the art, 1:1 frequency reuse between adjacent cells. The effect of this can be particularly significant for so-called "cell-edge users" located near the boundary between cells. For a cell-edge user, the distance to the one base station currently serving that user may be roughly the same as, or only marginally different to, the distances to the base stations that are in adjacent cells. It should also be noted that the received signal strength is typically highly correlated with distance. As a result, from the point of view of the user near the cell edge, the signal strength received from the serving base station may be only marginally stronger than, or approximately the same as, the signal strength from the base stations in the adjacent cells, as seen by the cell-edge user. And because common frequency resources may be used in adjacent cells (i.e. there is simultaneous use of substantially identical transmission frequencies in adjacent cells), signals being transmitted in the adjacent cells can often interfere with data being transmitted to the cell-edge user.

One method which has been proposed for addressing this difficulty is to coordinate the MIMO transmissions among multiple base stations (i.e. coordinating transmissions in adjacent or nearby cells) to eliminate or reduce this inter-cell interference. A full explanation of the techniques employed to achieve this coordination is not necessary for the purposes of this explanation. For present purposes it is sufficient to note that this coordination can reduce or eliminate inter-cell interference among coordinated cells (or coordinated portions of cells) and this can result in a significant improvement in the coverage of high data rates, cell-edge throughput and/or overall system throughput. However, the trade-off for this improvement is that the coordination of transmissions in multi-cellular MIMO systems requires channel state information (CSI) and data information to be shared among the coordinated base stations. This in turn results in a significant additional burden on the system's transmission and data capacity resources. In particular, for FDD systems, base station channel knowledge is mainly obtained by user equipment (UE) feedback (UE feedback is also useful in TDD-based systems). Since multiple cells or sectors participate in the coordinated transmission, the amount of channel knowledge required to be fed back increases linearly with the number of cooperating cells (or the number of cooperating cell sectors). In other words the UE may need to feed back information on each cell participating in the coordinated transmission, to the base stations providing those cells. It will be appreciated that this can place a heavy burden on the uplink channel particularly.

As explained in the previous paragraph, coordinated multi-cell MIMO transmission/reception (also often referred to as coordinated multi-point transmission/reception or CoMP) may be used to improve the coverage of high data rates, cell-edge throughput and/or to increase system throughput. The downlink schemes used in CoMP may be considered to fall into the following two categories:

"Coordinated Scheduling and/or Coordinated Beamforming (CS/CB)" and

"Joint Processing/Joint Transmission (JP/JT)".

An additional technique which may be employed is aggregation of multiple carriers (CA) to increase the available peak data rate and allow more complete utilisation of available spectrum allocations.

Incidentally, those skilled in the art will be generally familiar with the basics and underlying principles of beamforming, which is a signal processing technique that makes use of constructive and destructive interference to assist with directional signal transmission and/or reception. Further explanation of beamforming is therefore not required here.

In CS/CB, data to a single UE is transmitted from one transmission point, but decisions regarding user scheduling (i.e. the scheduling of timings for transmissions to respective user equipments) and/or beamforming decisions are made with coordination among the cooperating cells (or cell sectors). In other words, scheduling/beamforming decisions are made with coordination between the cells (or cell sectors) participating in the coordinated scheme so as to prevent, as far as possible, a single UE from receiving signals from more than one transmission point.

On the other hand, in JP/JT, data to a single UE is simultaneously transmitted from multiple transmission points to (coherently or non-coherently) improve the received signal quality and/or cancel interference for other UEs. In other words the UE actively communicates in multiple cells and with more than one transmission point at the same time.

Further details of CoMP as applied to LTE can be found in the document:

3GPP TR 36.814: "Further advancements for E-UTRA physical layer aspects (Release 9)", V1.0.0, 26.02.200926

In CA, discrete frequency bands are used at the same time (aggregated) to serve the same user equipment, allowing services with high bandwidth demands (up to 100 MHz) to be provided. CA is a feature of LTE-A (LTE-Advanced) which allows LTE-A-capable terminals to access several frequency bands simultaneously whilst retaining compatibility with the existing LTE terminals and physical layer. CA may be considered as an complement to JP for achieving coordination among multiple cells, the difference being (loosely speaking) that CA requires coordination in the frequency domain and JP in the time domain.

FIG. 6 schematically illustrates the working principles of the two above-mentioned categories of downlink transmission used in CoMP, although it should be noted that the way the base stations are illustrated relative to the distribution of the cells in FIG. 6 may not reflect the true distribution of base stations vis-à-vis cells in a practical wireless communication system. In particular, in a practical wireless communication system, the cells extend further than the hexagons shown in the Figure so as to overlap to some extent, allowing a UE to be within range of more than one base station at the same time. Furthermore, it is possible, in LTE for example, for the same base station (eNodeB) to provide multiple overlapping cells. Nevertheless, FIG. 6 is sufficient for present purposes to illustrate the principles of CS/CB and JP downlink transmission schemes respectively, used in CoMP.

Joint Processing (JP) is represented in FIG. 6(a) in which cells A, B and C actively transmit to the UE, while cell D is not transmitting during the transmission interval used by cells A, B and C.

Coordinated scheduling and/or coordinated beamforming (CS/CB) is represented in FIG. 6(b) where only cell B actively transmits data to the UE, while the user scheduling/beamforming decisions are made with coordination among cells A, B, C and D so that the co-channel inter-cell interference among the cooperating cells can be reduced or eliminated.

In the operation of CoMP, UEs feed back channel state information. The channel state information is often detailed, and often includes measurements of one or more of channel state/statistical information, narrow band Signal to Interference plus Noise Ratio (SINR), etc. The channel state information may also include measurements relating to channel spatial structure and other channel-related parameters including the UE's preferred transmission rank and precoding matrix.

As explained above, feedback of channel state information allows modification of the transmitted signal (typically modification by the base station(s) prior to transmission) to account for changing channel conditions and to maximise data throughput. More specifically, it is often done in order to perform precoder design, link adaptation and scheduling at the base stations. As also explained above, for FDD systems, to achieve equivalent detail of channel knowledge for each cell, the total amount of channel information needed to be fed back increases linearly with the number of cooperating cells (or sectors of cells), and this creates a heavy additional burden for the uplink channel particularly.

Conventionally, CSI reporting is provided for without taking into account multiple cells or their relative significance in communications with a specific UE. However, as explained above, in CoMP there is coordination between cells, and in fact, in the case of the joint processing (JP) downlink transmission scheme discussed above, data to a single UE is simultaneously transmitted from multiple transmission points. Note that "coordination between cells" could be understood to include cells on different carrier frequencies (i.e., CA), which may be supported by one base station or a number of co-located base stations, as well as cells supported by geographically-separated base stations (i.e., COMP).

Therefore, it its worth Investigating feedback schemes which can save the feedback overhead for the uplink channel used for multi-cell DL MIMO transmissions.

SUMMARY OF THE INVENTION

According to a first aspect of the present invention, there is provided a method for use in a multiple-input multiple-output communication network in which:
 the network comprises a plurality of cells provided by one or more base stations operable to transmit signals on at least one downlink to, and receive signals on at least one uplink from, one or more user equipments,
 a user equipment is operable to feed back to the network reports on channel state information, CSI, relating to one or more channels between base stations and that user equipment; and
 base stations are operable to adapt downlink signals to user equipments based on the CSI reports, the method comprising:
 identifying uplink resources for a user equipment-initiated channel state message;
 the user equipment judging a need for a user equipment-initiated channel state message based at least partly on information not available to the network; and
 the user equipment sending the user equipment-initiated channel state message to the network using the identified uplink resources.

Here, and throughout this section and the claims, the term "cell" is intended also to include sectors of cells.

The user equipment-initiated channel state message may comprise one or more of:
- a CSI report;
- a request to send a CSI report;
- a request for a change in a rate of CSI reports;
- a request for a change in a mode of CSI reporting;
- a request for a change in transmission mode between the user equipment and the network.

The judging step may be based on a change in channel state of the downlink observed by the user equipment. In that case the judging step preferably employs one or more of the following criteria as determined by the user equipment:
- channel matrix;
- channel spatial structure
- signal to interference ratio, SIR, signal to noise ratio, SNR, or signal to interference plus noise, SINR
- transmission rank preferred by the user equipment
- transmission mode preferred by the user equipment;
- preferred precoding matrix of the user equipment;
- expected data rate;
- rate of change of channel state; and/or
- function of channel state at two or more points in time.

Also, the judging step may be based on a change in capabilities of the user equipment. This can involve any of the following properties of the user equipment:
- number of receiving antennas available;
- available processing power;
- number of transceivers available;
- available electrical power;
- position and/or velocity of the user equipment.

In one form of the method, the identifying step comprises the network making resources for the user equipment-initiated channel state message available permanently, or for a defined length of time, to the user equipment. In the case of an LTE-base system the resources may include one or more of:
- a persistent uplink grant of resources on a physical uplink shared channel, PUSCH;
- a periodic allocation of resources on a physical uplink control channel, PUCCH;
- a grant of resources on a random access channel, RACH on a non-contention basis.

Alternatively the method may involve the step of the user equipment requesting resources from the network for sending the user equipment-initiated channel state message, the network making resources available in response to such a request. In a LTE-based wireless communication system the request can be made using one or more of:
- a CSI message on PUCCH or PUSCH;
- a medium access control layer, MAC, message
- a RACH message.

As a further alternative, in the identifying step involves identifying resources for the user equipment-initiated channel state message which are available on a contention basis.

In the above methods, where the user equipment-initiated channel state message is a CSI report, this can be in addition to any CSI report requested of the user equipment by the network. In other words the user equipment-initiated report can augment existing network-commanded CSI reports already provided for in the system.

Alternatively, the CSI report is instead of a CSI report requested of the user equipment by the network. This allows uplink resources to be freed since possibly unnecessary CSI reports (in instances where the channel state etc. has not changed significantly) can be dispensed with.

According to a second aspect of the invention, there is provided a user equipment, UE, for use in a multiple-input multiple-output communication network in which:
the network comprises a plurality of cells provided by one or more base stations operable to transmit signals on at least one downlink to, and receive signals on at least one uplink from, the UE,
the UE is operable to feed back to the network reports on channel state information, CSI, relating to one or more channels between base stations and the UE; and
base stations are operable to adapt downlink signals to the UE based on the CSI reports, the UE configured to:
identify an uplink resource suitable for a user equipment-initiated channel state message;
judge a need for a user equipment-initiated channel state message based at least partly on information not available to the network; and
send the user equipment-initiated channel state message to the network using the available uplink resource.

According to a third aspect of the present invention, there is provided a base station, BS, for use in a multiple-input multiple-output communication network in which:
the network comprises a plurality of cells of which one or more are provided by the BS, the cells operable to transmit signals on at least one downlink to, and receive signals on at least one uplink from, one or more user equipments,
the user equipments feed back to the network reports on channel state information, CSI, relating to a channel between the BS and the user equipments; and
the BS is operable to adapt downlink signals to the UE based on the CSI reports;
wherein the BS is arranged to:
identify resource suitable for a user equipment-initiated channel state message;
receive the user equipment-initiated channel state message on the identified uplink resource; and
reconfigure the channel in response to the user-initiated channel state message.

The above-defined UE and BS may be configured to provide any of the features enumerated above with regard to the method of the invention.

Further aspects of the present invention may provide a wireless communication system arranged to operate in accordance with any of the above methods, as well as software for allowing transceiver equipment equipped with a processor to provide the UE or BS as defined above. Such software may be recorded on a computer-readable medium.

In general, and unless there is a clear intention to the contrary, features described with respect to one aspect of the invention may be applied equally and in any combination to any other aspect, even if such a combination is not explicitly mentioned or described herein.

As is evident from the foregoing, the present invention involves signal transmissions between base stations and user equipments in a multiple-input multiple-output (MIMO) wireless communication system. A base station may take any form suitable for transmitting and receiving such signals. It is envisaged that the base stations will typically take the form proposed for implementation in the 3GPP LTE, 3GPP LTE-A, IEEE 802.16 and 802.11 groups of standards, and may therefore be described as a NodeB or an eNodeB (eNB) (which term also embraces Home eNodeB or HeNB) as appropriate in different situations. However, subject to the functional requirements of the invention, some or all base stations may take any other form suitable for transmitting and receiving signals from user equipments, and for adapting signals for transmission to user equipments based on fed back channel state information.

Similarly, in the present invention, each user equipment may take any form suitable for transmitting and receiving signals from base stations. For example, the user equipment may take the form of a subscriber station (SS), or a mobile station (MS), or any other suitable fixed-position or movable form. For the purpose of visualising the invention, it may be convenient to imagine the user equipment as a mobile handset (and in many instances at least some of the user equipments will comprise mobile handsets), however no limitation whatsoever is to be implied from this.

In the wireless communication system, the arrangement of base stations with respect to each other may define the layout of the cells (and the sectors of the cells). The invention is not necessarily limited to any particular base station arrangement or cell layout.

BRIEF DESCRIPTION OF THE DRAWINGS

Reference is made, by way of example only, to the accompanying drawings in which.

DETAILED DESCRIPTION

Figure 1:
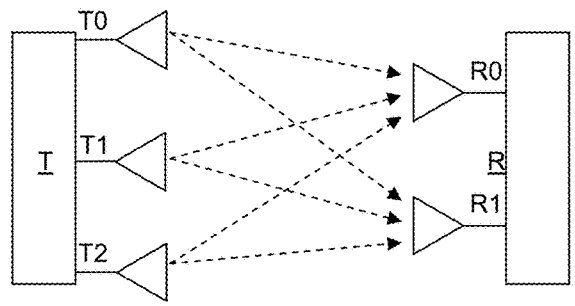
FIG. 1 is a schematic representation of a simplified 2×3 MIMO system and the individual SISO channels between the respective transmitter and receiver antennas.
Figure 2:
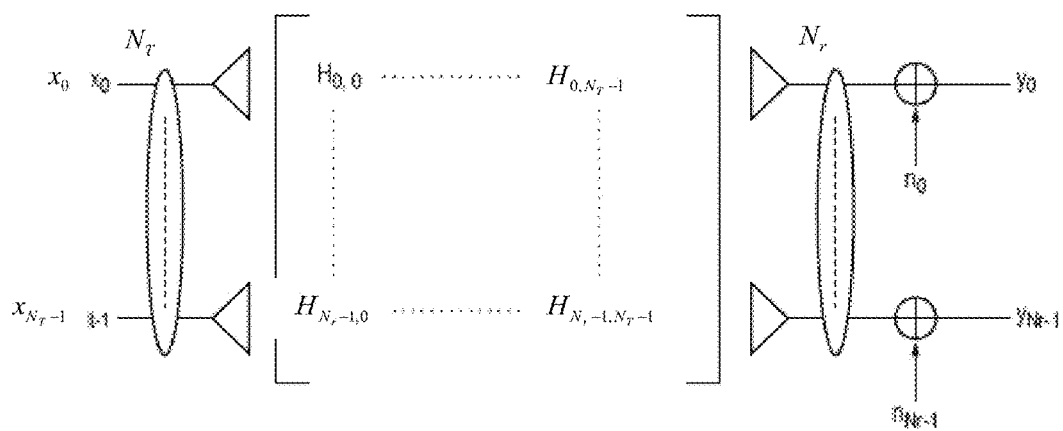
FIG. 2 is a conceptual diagram of a more generalized MIMO system in which the transmitter has $N_T$ transmitting antennas, and the receiver has $N_r$ receiving antennas.
Figure 3:
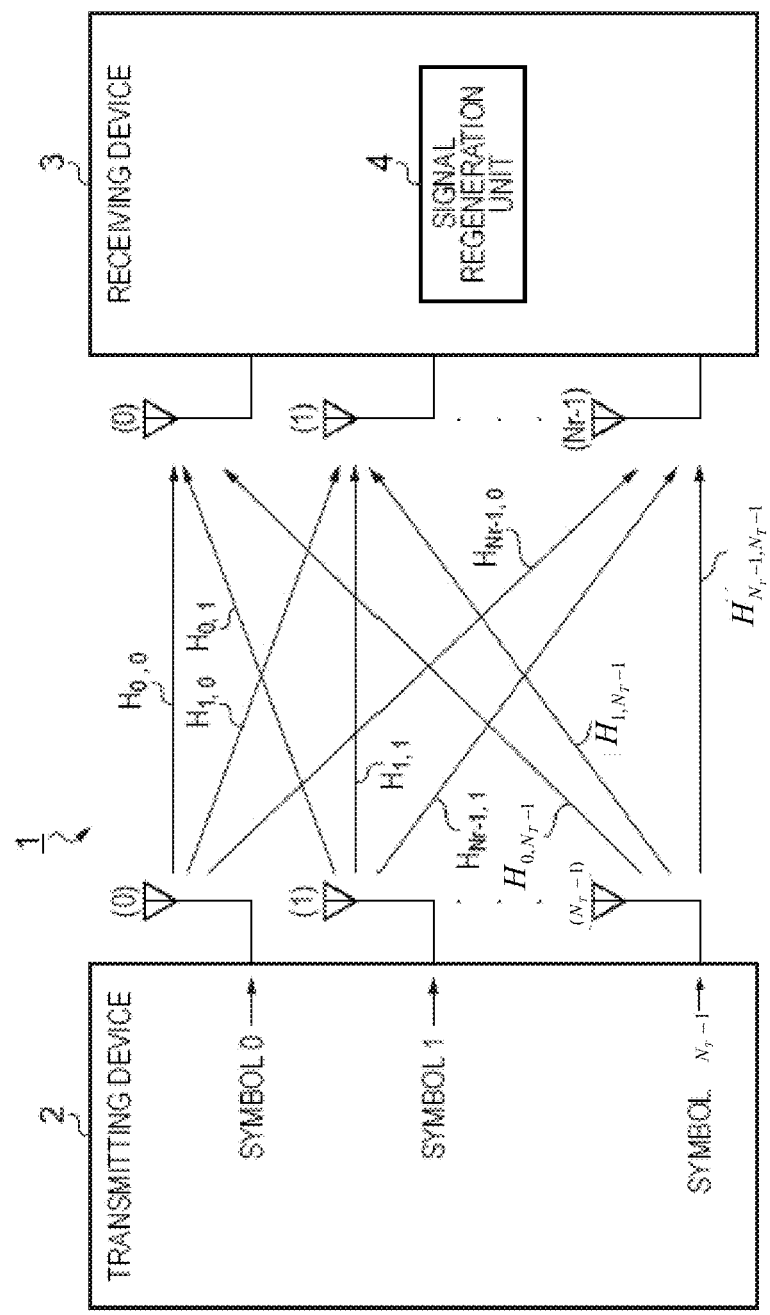
FIG. 3 is a schematic representation system similar to that given in FIG. 1, but relating to a more generalised MIMO system.
Figure 4:
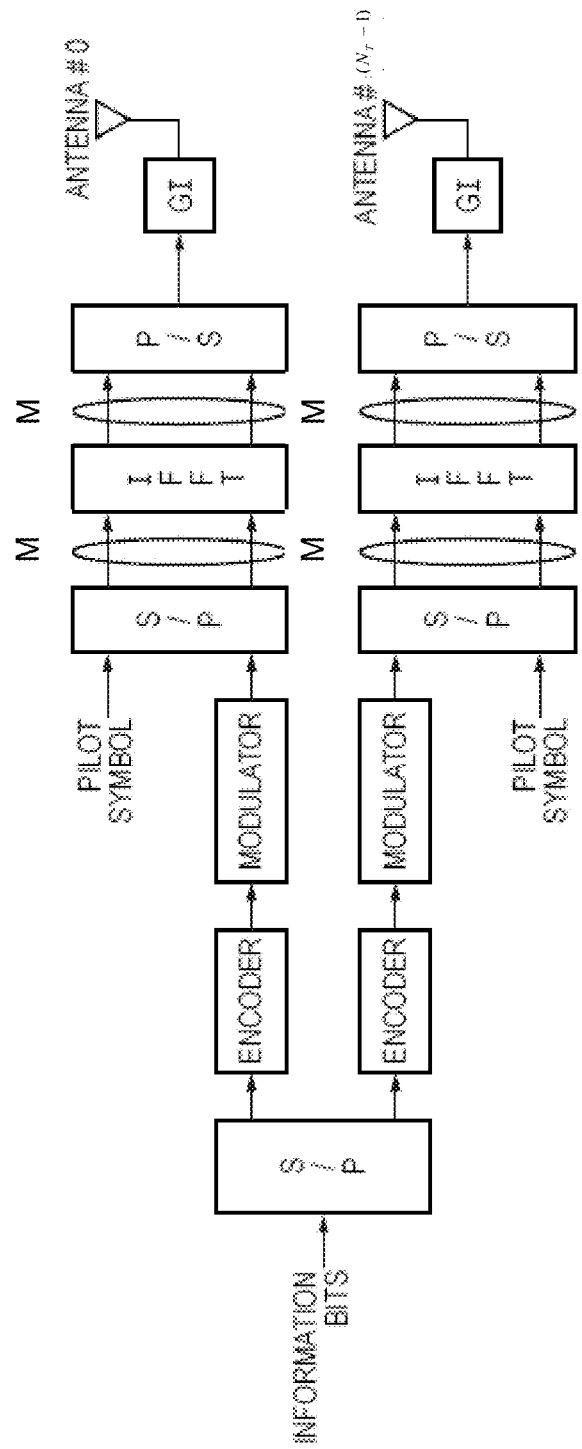
FIG. 4 is a schematic representation illustrating certain important functional components of a MIMO-OFDM transmitter.
Figure 5:
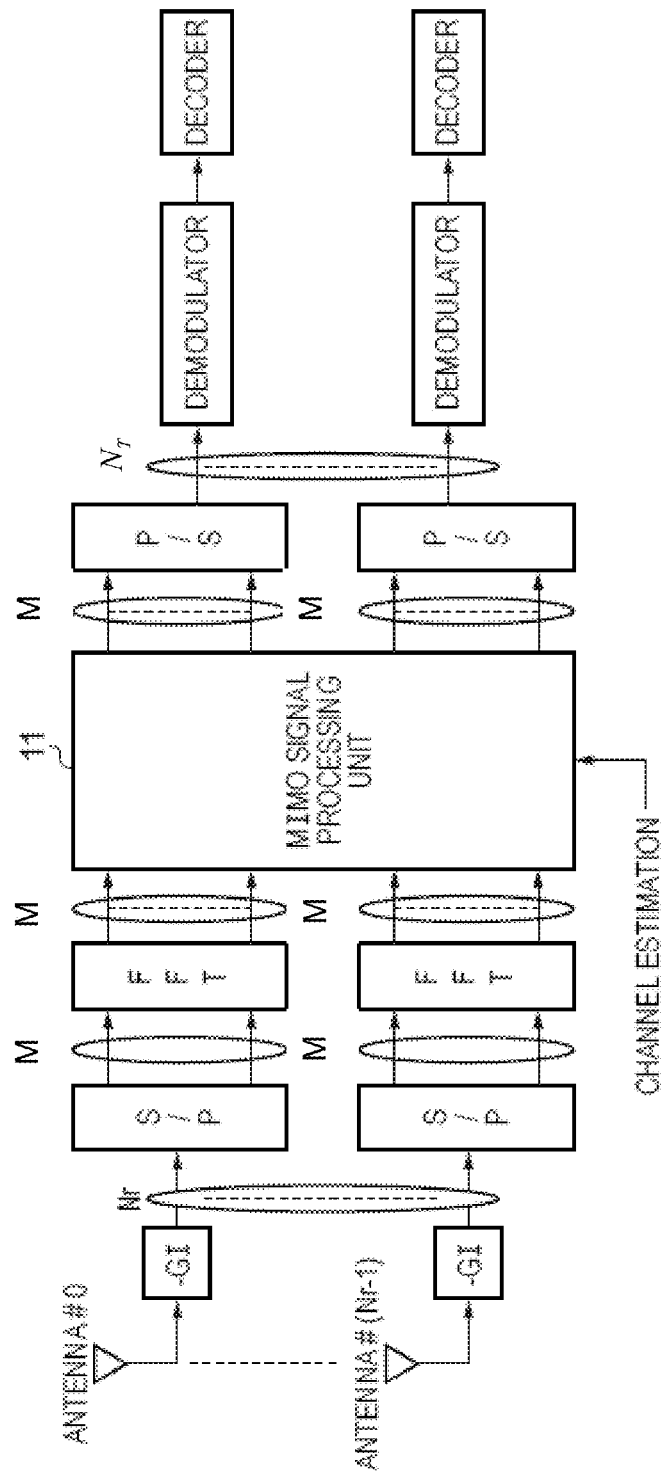
FIG. 5 is a schematic representation illustrating certain important functional components of a MIMO-OFDM receiver.
Figure 6:
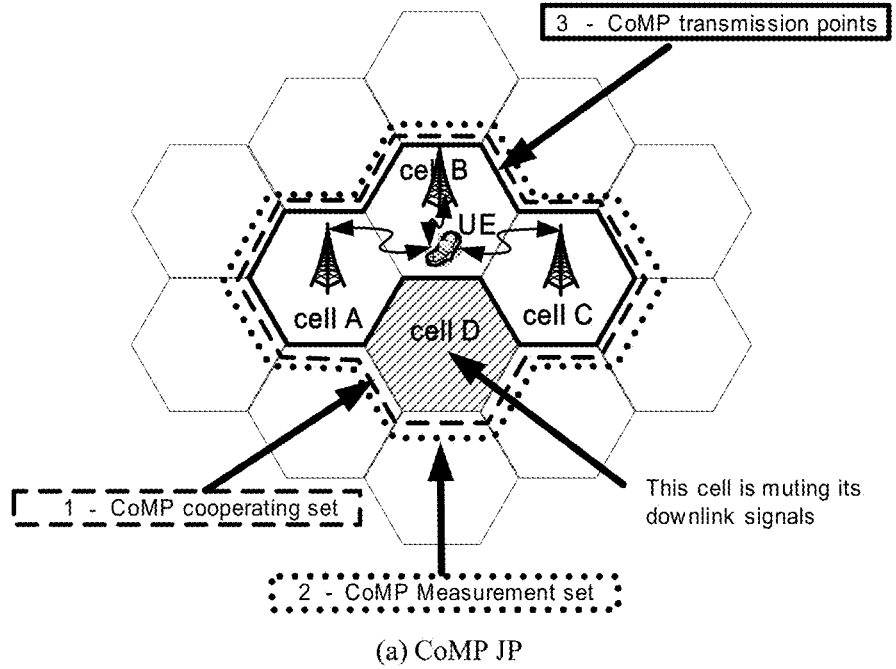
FIG. 6(a) schematically illustrates the working principles of so-called joint processing (JP) downlink transmission used in CoMP.
FIG. 6(b) schematically illustrates the working principles of so-called coordinated scheduling and/or beamforming (CS/CB) downlink transmission used in CoMP.
Figure 6:
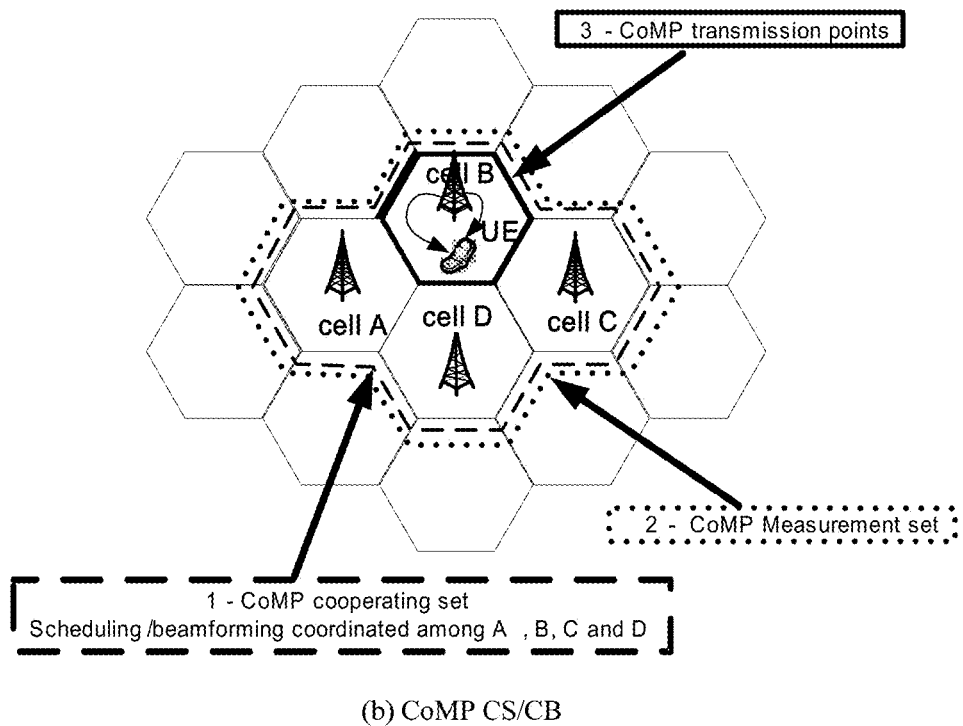
Figure 7:
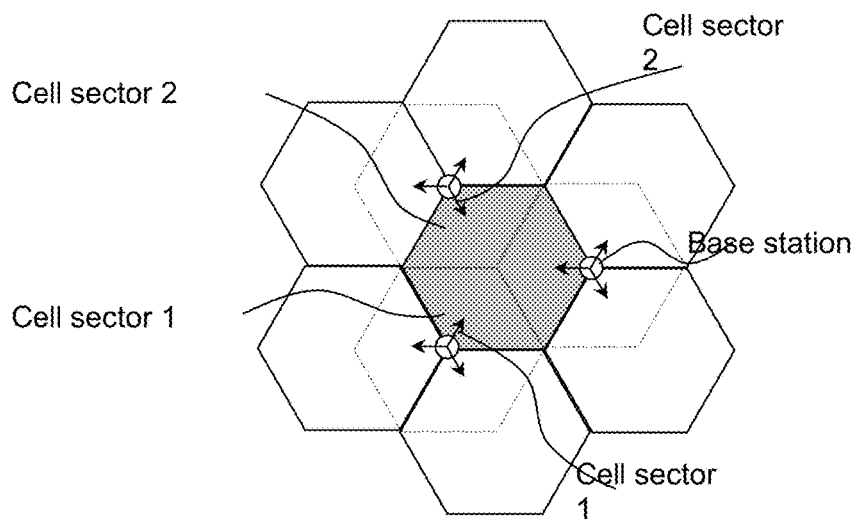
FIG. 7 schematically illustrates one way in which base stations, cells and cell sectors may be distributed in wireless communication systems of the kind to which the present invention may be applicable.
Figure 8:
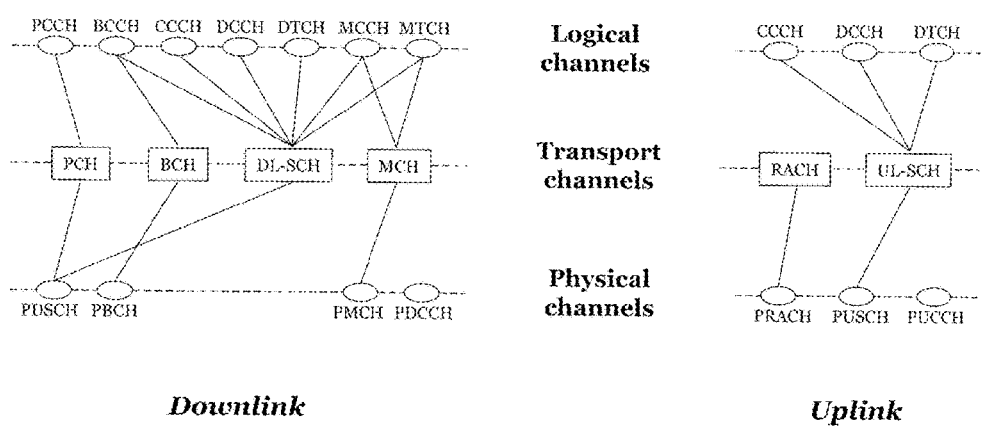
FIG. 8 illustrates the relationships among logical channels, transport channels and physical channels defined in LTE.

In the above explanation, the term "channel" (as in MIMO channel) has been used to describe the response of the entire radio link between a transmitter and a receiver. However, the term "channel" is also used in another sense to denote capacity reserved on the uplink, or downlink, for various purposes. Such channels can be defined at various levels of abstraction within the network. FIG. 8 shows some of the channels defined in LTE at each of a logical level, transport layer level and physical layer level, and the mappings between them. For present purposes, the channels at the physical layer level are of particular interest.

On the downlink, user data is carried on the Physical Downlink Shared Channel (PDSCH). There are various control channels on the downlink, which carry signalling for various purposes. In particular the Physical Downlink Control Channel, PDCCH, is used to carry scheduling information from base stations (called eNodeBs in LTE) to individual UEs.

Meanwhile, on the uplink, user data and also some signaling data is carried on the Physical Uplink Shared Channel (PUSCH), and control channels include a Physical Uplink Control Channel, PUCCH, used to carry signalling from UEs including channel quality indication (CQI) reports, precoding matrix information (PMI), a rank indication for MIMO, and scheduling requests. That is, in LTE, recommendations on transmission rank and which precoder matrix to use may be provided by the UE together with the reporting of CQI. These recommendations (which can be thought of as forms of CSI) guide the eNB in adapting the transmission rank, as well as the precoder and the coding rate and modulation to the current channel conditions. However, the eNB can override the UE recommendations.

Currently LTE supports both periodic CSI reports (on PUCCH or PUSCH, if transmitted) and aperiodic CSI reports (on PUSCH). Typically, aperiodic CSI reports can carry more information, since there are likely to be more resources available when PUSCH is transmitted. Therefore, in the case that a UE triggered CSI report would be more detailed than a periodic CSI report (e.g. more accurate, or covering more cells), or can be delivered more quickly, it could be advantageous for the UE to trigger such a CSI report, even if periodic CSI reports are already configured. Aperiodic CSI reports are commanded using a message on PDCCH, which also defines the UL resources to be used.

The present invention is of particular, but not exclusive, application to LTE and is proposed as a potential improvement to LTE (i.e. LTE-Advanced). It has a number of features, including triggering of a CSI report by the UE, some means of indicating to the network the transmission (or need for the transmission) of a CSI report from the UE and some means of determining which resources are used for the CSI report.

Figure 9:
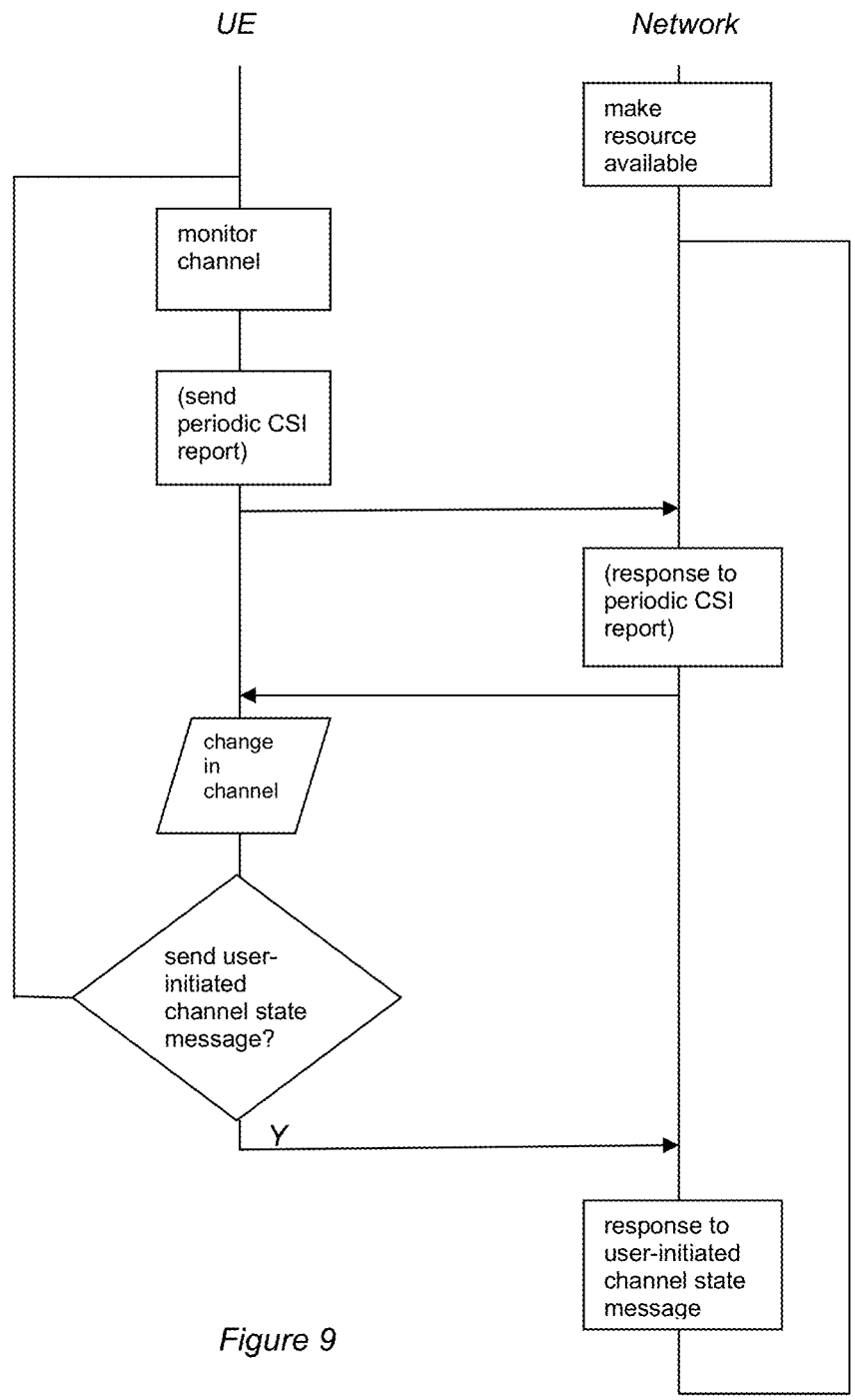
FIG. 9 is a flowchart of the main steps involved in a method embodying the invention.

The method of the invention is outlined in the flowchart of FIG. 9. The process begins, as shown, with the network making available some resource for the novel UE-initiated CSI report. This need not be an explicit provision of resource, as explained below. The UE monitors the channel with the cell (or cells) in which it communicates. In particular it can determine channel quality from detecting reference signals (RS) transmitted by the network. As part of its conventional operation, the UE may send a periodic CSI report as shown. In addition, or alternatively, though not illustrated, the network may command the UE to send an aperiodic CSI report at any time. Assuming that a periodic CSI report is sent by the UE, the network responds to this in some way, e.g. by adapting the downlink to maintain a data rate at a required level.

At some point, the UE detects a change in the channel significant enough to warrant a UE-initiated CSI report. (Here, "significant" could mean, for example, a 20% change in some parameter such as data rate). In the event that the UE decides to send a UE-initiated CSI report, it signals the network as indicated by the horizontal arrow labelled Y, and this report is responded to in the network in some way. Although not illustrated for simplicity, this step of reporting by the UE may involve the UE first sending a request to send the CSI report, as will be explained below.

Some novel features of embodiments of the present invention include:
(i) Triggers for CSI feedback:
  change in UE location
  change in "available" UE capability
  change in battery status or change in operation constraints arising from battery depletion or recharge level
(ii) New signalling support for UE-triggered CSI reporting
(iii) UE requesting the network to change the UE configuration.

Standardisable aspects include the physical layer signalling, the definition of CSI reporting trigger conditions, and RRC (Radio Resource Control) configuration details.

Regarding the above feature (i), in general a CSI report should be triggered by the UE where it has information available to the network and it can judge that in the current conditions a new CSI report would be beneficial. The advantage of this approach in LTE is that it avoids or reduces the signalling overhead needed to transfer the relevant information to the network, which would be needed if the network made all the decisions on CSI reporting (i.e., decisions to trigger aperiodic CSI reports and configure periodic CSI reports). This includes the possibility of reducing the UL signalling overhead (e.g. due to a high rate of periodic CSI reports) that would otherwise be needed to ensure that the network is sufficiently aware of new channel conditions. Alternatively, with a given amount of signalling overhead, DL performance can be improved due to better CSI being available in the network.

Possible triggers based on a sufficiently-large change in channel state include the following:
(a) Change in observed DL channel state, based on:
  Channel Matrix
    Measured by the UE using CSI-RS (CSI-Reference Signal), CRS
  (Common-RS) or DRS (Dedicated RS)
    Channel spatial structure
      e.g. correlation matrix distance (CMD)
    SIR, SNR, or SINR
    Transmission rank preferred by the UE
    Transmission mode preferred by the UE (e.g. CoMP or single cell, or MU/SU-MIMO)
    Preferred precoding matrix (e.g. PMI)—see below
    Expected data rate (e.g. CQI)
    Rate of change of channel state
    General function of channel state at two or more instants in time Other changes may imply a change in channel state, for example changes in UE location, or velocity, perhaps measured using location technology such as GPS, could be used to trigger a CSI report.

There is some overlap among the above criteria. The correlation matrix distance (CMD) may be regarded as a measure of rate of change in the channel matrix, and the significance of the change in the PMI can be evaluated using the CMD. CMD is discussed in the following document:

M. Herdin, N. Czink, H. Ozcelik, and E. Bonek, "Correlation matrix distance, a meaningful measure for evaluation of non-stationary MIMO channels", in IEEE VTC spring 2005, vol. 1, 2005, pp. 136-140.

The above CMD may be thought of as a "narrowband" CMD. An alternative "extended" or "wideband" CMD is proposed in a co-pending European Patent Application 09180243.9 by the present applicant, entitled "Feedback Interval Control", the content of which is incorporated by reference. Either or both forms of CMD may be applied in the present invention.

To explain the significance of transmission rank in this context, the achievable data rate is typically a function of the channel conditions (i.e. numbers of transmit and receive antennas, channel matrix and SINR—signal to interference plus noise). A limited set of possible transmit precoder matrices (i.e. beamformers) include precoders with different transmission ranks. In a given set of channel conditions, each precoder will give a particular data rate, and will have a corresponding transmission rank. Therefore selecting the precoder estimated to give the highest data rate will also lead to a recommended transmission rank. In practice the transmission rank tends to be correlated with the SINR.

In deciding preference for a given transmission rank, the UE also selects a precoder which maximises the achievable data rate. If this precoder is selected from a codebook, the index to the selected code book entry is the PMI (precoding matrix indicator). So to quantify the size of the change in the PMI from one time instant to another (or rather the change in the matrix indicated by the PMI), a UE may calculate the CMD using the two matrices indicated by the two different PMI values. In LTE Release 8/9, the UE typically computes a single PMI. Considering that the preferred precoder in LTE Release 10 may be specified by two matrix indices referring to entries from different codebooks, the relevant change could be in one or both metrics or indices. In LTE Release 10 more than one PMI may be derived (e.g. best/worst companion).

CSI triggering can also, or alternatively, be derived from a change in status of the UE, which may reflect the ability of the UE to receive particular transmission modes, numbers of spatial streams or data rates, such as:
(b) Change in UE capability
  number of receive antennas
  available processing power
  number of UE transceivers available For example, the UE's processing power or number of available transceivers may be temporarily reduced if some hardware resources are being used for another purpose, such as for receiving a broadcast transmission (e.g., MBMS).

CSI triggers may also, or alternatively, arise from considerations of power availability at the UE. For example it may be wished to limit the data rate to the UE in order to conserve battery power. This a further class of triggers is:
(c) Change related to electrical power supply at UE
  switch between mains and battery power supplies
  battery charge status
  policy on conserving power (e.g. "economy mode" set by the user)
(d) In addition, a change at the application level at the UE may be a trigger for a CSI report, in view of QoS (quality-of-service) requirements for instance. For example, if an application is running short of data (e.g. for streaming), triggering an additional CSI report may result in a higher data rate being obtained by the UE.
(e) Time-based criteria may also be applied. For example, a CSI report may be triggered when the time elapsed since the last CSI-triggering event, without a "normal" CSI report having been issued, exceeds a threshold. Here, a "normal" CSI report refers to a periodic CSI report or an aperiodic report commanded by the network.

As already mentioned there is a need for suitable resources to carry the user equipment-initiated channel state message. In general such resources may either be predetermined by the network and known to the UE e.g. as part of a RRC configuration, or explicitly informed to the UE by the network either in advance or on request, or identified by the UE of its own volition.

For the transmission resources suitable to permit such a UE-initiated CSI report to be sent once triggered, some possible approaches (again referring to LTE) are as follows:
(i) UL resources are permanently available, or made available at least for a defined time period, but only used when needed. This is less preferable in terms of resources used. Options here include:
  Persistent UL grant on PUSCH
  Periodic PUCCH allocation, with the conventional periodic CSI report either replaced by, or in addition to, the UE-triggered CSI report of the invention
  Non-contention RACH
(ii) UL resources are granted when required. This is efficient in terms of resource use but requires more signalling, as the UE needs to request resources for the CSI report (see below). In other words there is a UE-initiated request to send a CSI report in addition to the CSI report itself.
(iii) Contention-based CSI report transmission. This approach may suffer from collisions as different UEs attempt to send CSI reports at the same time. Either contention-based RACH or blind transmission on PUCCH/PUSCH, limited to a subset of possible resources, may be used for this purpose.

In the case of option (ii) above, resources to be used for the CSI transmission may be signalled to the UE when the UE-initiated request to send a CSI report is followed by a UL grant with a command for aperiodic CSI (which includes the resource allocation). This has the advantage of requiring only a small amount of additional signalling in the uplink.

Alternatively, the UE may explicitly indicate to the network the resources that it will use for the UE-triggered CSI report. In such a case, network confirmation of the CSI request is not necessarily required. The network may configure the set of resources available to the UE, or in other words identify to the UE the subset of resources suitable for this purpose. If there is a suitable delay between the UE indicating its use of resources and the actual transmission, the network scheduler can then take into account the UE request and ensure that the necessary resources are free. On the other hand, in order to avoid potential collisions with other UEs, a mechanism can be provided to allow the network to confirm or deny the UE permission to transmit. This reduces the DL signalling overhead at the cost of a small additional UL signalling overhead for indicating the resource.

The CSI resources may be determined implicitly, for example, depending on the UE identity, or a characteristic of the signal used for the CSI request. There could be a linkage between the CSI report trigger condition (e.g. CSI change in a particular cell) and the resources to be used for the CSI report. The advantage of this approach is that the signalling overhead of the resource indication is not needed, but it may limit the flexibility of system operation (e.g. scheduling).

In terms of the specific signalling to be used in LTE, there are various options for explicit signalling of a UE-initiated CSI report request:
(a) existing CSI message structure on PUCCH or PUSCH
  using reserved values
  replacing existing bits
  extending with additional bit(s)
(b) MAC message
(c) RACH When using CA, the signalling of a CSI request (i.e. signalling for permission to send a user equipment-initiated CSI report) may be on a different carrier than the one used for the CSI report.

With multiple cells (CoMP and/or CA) there is likely to be a need for indicating to which cell the CSI report request applies. This could be done explicitly; alternatively, this could be indicated implicitly. For example, if the CSI report request is carried in a CSI message on PUCCH/PUSCH, there may already be a linkage defined between that CSI message and a particular cell (or carrier). The same linkage could indicate the cell (or carrier) for which the CSI report is being requested.

It may be possible to indicate a CSI report request implicitly, for example by a particular change in data value (s) in the periodic CSI on PUCCH. For example, if the preferred transmission rank (RI) changes, then this could be understood as a UE request to send a CSI report.

In order to control the UL signalling load, there may be a limit defined for the UE in the system specifications or configured by the network. For example this may be a limit on the rate of UE requests for CSI reports, or a limit on the interval between such requests.

As described above, the UE-initiated action is a CSI report (including, where necessary, a request for permission/resource to send such a report). However, more generally the UE-initiated action may be called a "user equipment-initiated channel state message", which term is intended to cover related reports/requests, in particular a request for a change in the network-signalled configuration of the UE, such as:
  a change in the CSI reporting rate. (i.e., interval between periodic CSI reports). Thus, the user equipment-initiated channel state message would have the effect of, for example, increasing the frequency of future reports rather than providing a one-off report. This would be appropriate if the fading rate changed due to a change in UE velocity.
  a change in a cell for which CSI is being reported. This refers to the case of CoMP or CA in which the UE is in communication with a plurality of cells simultaneously.
  a change in CSI reporting mode. This may include a change in the contents of the CSI information (e.g. whether the channel state is reported for the whole frequency band or one or more parts of the band, or which parameters are included in the CSI report). As an example, this would be appropriate if the nature of the channel changed, as might occur if a UE were to move from a line-of-sight near a BS to a multi-path channel further away, or if the UE were to undergo a large change in path loss as for example might occur moving from outdoors to inside a building.
  a change in transmission mode (as configured at the UE). An example would be a change from closed-loop MIMO to transmit diversity on the DL, arising from an increase in UE velocity. Typically transmit diversity can exploit uncorrelated fading on the different paths between different pairs of transmit and receive antennas, without knowledge of the channel matrix at the transmitter. Closed loop MIMO makes use of channel knowledge (in particular feedback) to optimise transmission parameters (in particular the precoding matrix) for the particular channel conditions. So in the absence of feedback, or where the feedback cannot be provided quickly enough related to changes in the channel, it is preferable to use transmit diversity instead of MIMO.
  Since the network is likely to want to control resources for CSI feedback (and downlink resources for data transmission), an additional useful feature is for the network to configure the UE with some limits on the changes it is allowed to request.

The contents of a UE triggered CSI report may depend on factors triggering the request for a CSI report. For example, if a CSI report is triggered by a change in the channel for one cell, the resulting CSI report could contain only the CSI information for that cell. If the CSI report is changed for some other reason, such as UE status or power supply, then CSI may be reported for all the cells for which CSI measurements are available. In general, recent CSI measurements may not be available for some cells (e.g. if CSI-RS symbols have not been transmitted recently on those cells). The information on which cells the CSI report covers can be included in the CSI report itself (e.g. as a bitmap).

Some more particular embodiments of the present invention will now be outlined with regard to an LTE-A network by way of example.

In a first embodiment, the network uses FDD and comprises one or more eNodeBs, each controlling at least one downlink cell, each with a corresponding uplink cell. Each cell may serve one or more terminals (UEs) which may receive and decode signals transmitted in that cell. In order to schedule the appropriate use of transmission resources in time, frequency and spatial domains for transmission to the UEs they each provide the eNodeBs with information on the status of the downlink channel (CSI), derived from measurements made on reference symbols (such as CSI-RS, CRS or DRS mentioned above) transmitted in each cell by the corresponding eNodeB. Mechanisms available in LTE Release 8 and 9 support the reporting of CSI information for only one cell (the serving cell) from any given UE. CSI reports may be periodic (with timing and periodicity configured by the network) or aperiodic, where the eNodeB commands the UE to transmit a CSI report at a particular instant.

In this embodiment, in consideration of defined criteria, the UE determines the need to transmit at least one CSI report. This would be additional to or instead of one of any reports already configured by the network. Further, the UE signals to its serving eNodeB a request to transmit a CSI report. On receiving a positive response, the UE transmits the CSI report using the desired resources.

In a preferred version of the first embodiment, the trigger for the UE request to send a CSI report is a change in the UE capability to receive DL transmission at a given rate. In other versions of this embodiment, trigger conditions may be based on one or more of the parameters described above. The use of a particular trigger condition may be configured by the network (e.g. by RRC signalling).

In a preferred version of the first embodiment the UE request to send CSI is signalled using the RACH channel. In other versions of this embodiment the signalling mechanism could be any of those described above. The use of a particular mechanism may be configured by the network (e.g. by RRC signalling).

In a preferred version of the first embodiment the network may respond to the UE CSI request by commanding an aperiodic CSI report using the PDCCH. In other versions of this embodiment the transmission resources for the CSI report could be defined according to any of the other methods described above (e.g. in sections 3.2 and 3.3). Again, use of a particular mechanism may be configured by the network (e.g. by RRC signalling). In some variations of this embodiment there may be no explicit response from the network.

In a second embodiment, which is an extension of the first embodiment but otherwise similar, the network comprises one or more eNodeBs, each controlling one or more downlink cells, and corresponding uplink cells. Some of the cells controlled by a given eNodeB have different carrier frequencies. A given terminal (UE) may simultaneously receive and decode signals transmitted by more than one cell. In typical configurations, the cells received by a UE may be controlled by the same eNodeB but have different carrier frequencies (CA) and/or be controlled by different eNodeBs and have the same carrier frequencies (CoMP).

In order to schedule the appropriate use of transmission resources per cell in time, frequency and spatial domains, the UEs provide the eNodeBs with information on the status of the downlink channel (CSI), derived from measurements made on reference symbols transmitted in each cell by the corresponding eNodeB. Mechanisms available in LTE Release 8 and 9 support the reporting of CSI information for only one cell (the serving cell) from a given UE. CSI reports may be periodic (with timing and periodicity configured by the network) or aperiodic, where the eNodeB commands the UE to transmit a CSI report at a particular instant.

Currently LTE does not support a command which indicates that a CSI report should be sent for a particular cell. In general, the network is in control of most aspects of UE operation: the UE may indicate a request to send CSI for a particular cell, but the network is free to actually ask for a CSI report for a different cell. Thus, additional mechanisms are used to enable the UE to provide its serving eNodeB with CSI information for more than one cell. For example, the periodic CSI reports may be configured to cycle through a set of cells, or the information in the command for an aperiodic CSI report may also specify which cell (or cells) should be included in the report.

In accordance with the invention, in consideration of defined criteria, the UE determines the need to transmit at least one CSI report. This would be additional to or instead of one or any reports already configured by the network. Further, the UE signals to its serving eNodeB a request to transmit a CSI report. On receiving a positive, the UE transmits the CSI report using the designated resource.

All the variations described for the first embodiment may also be applied to the second embodiment.

In variations of the second embodiment, the report triggered by the UE may be additional to already configured periodic reports or refer to additional cells.

In a preferred version of the second embodiment, the trigger for the UE request to send a CSI report is a change in the channel state for the propagation paths associated with at least one cell, determined on the basis of any of the criteria listed above.

Preferably also, the UE is configured to report a limited set of CSI information using periodic reports on PUCCH. This may be limited in the amount of detail or the number of cells reported, or in the rate at which the complete set of CSI information is signalled. In this way, the network may configure the UE to send particular CSI information in the form of periodic reports and more detailed reports are sent following a request from the UE. The UE request to send CSI is signalled using the PUCCH channel by means of an additional bit field (e.g. 1 bit).

In a preferred version of the second embodiment, the network may respond to the UE CSI request by commanding an aperiodic CSI report using the PDCCH. The CSI report may apply to one or more cells. and this is indicated as part of the CSI report.

In a third embodiment, otherwise similar to the first or second embodiments, instead of indicating the need to report CSI, the UE requests the network to make change In the UE configuration. In different variations of this embodiment, the UE requests one of a change in CSI reporting rate, a change in cell (or cells) for which CSI is reported, change in CSI reporting mode or a change in transmission mode. As an additional feature, the range of possible changes which the UE may request is limited, typically by means of signalling from the network.

In variations of the above embodiments, the content of a UE-triggered CSI report depends on the factors triggering the request for the CSI report. If a CSI report is triggered by a change in the channel for one cell, the resulting CSI report contains only the CSI information for that cell. If the CSI report is changed (issued) for some other reason, such as UE status or power supply, then CSI is reported for all cells for which information is available. In general, recent CSI measurements may not be available for some cells (e.g. if CSI-RS symbols have not been transmitted recently on those cells).

Various other modifications are possible within the scope of the present invention.

For example the invention does not require that the user equipment-initiated channel state message is sent to any particular BS (although in practice the information on the co-operating cells should end up in the entity that will make use of it, such as for scheduling transmissions to one or more UEs). Feedback may be sent to one or more of the BS, and then routed within the fixed network to the coordinating entity. This could be one of the BS or an eNodeB or perhaps used in a distributed scheduling/coordinating algorithm.

As mentioned, one or more eNBs providing base stations in an LTE-based implementation may be HeNBs. In this case it is conceivable that the cell(s) defined by one or more HeNBs may completely overlap (or be surrounded by) the cell(s) of a (macro) eNB.

The present invention has been described with regard to the DL but could also be applied on the UL. DL and UL cells normally have similar geographical coverage, but this is not essential. By definition, in FDD UL and DL operate at different carrier frequencies.

Likewise, the present invention has been explained with particular reference to FDD-based systems, but this is not essential. The invention could equally also be applied in TDD, although since the channel transfer function may be reciprocal, the requirements for CSI will differ.

As already stated, the user equipment-initiated channel state message is not necessarily, or not necessarily exclusively, a CSI report, and the various criteria enumerated above such as those for triggering a CSI report apply equally to other forms of user equipment-initiated channel state message.

In any of the aspects or embodiments of the invention described above, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein.

A computer program embodying the invention may be stored on a computer-readable medium, or it could, for example, be in the form of a signal such as a downloadable data signal provided from an Internet website, or it could be in any other form.

It is to be clearly understood that various changes and/or modifications may be made to the particular embodiment just described without departing from the scope of the claims.

INDUSTRIAL APPLICABILITY

Network configured periodic or network commanded aperiodic transmission of CSI by the terminal can provide the base station with current knowledge of the DL channel state for each mobile terminal. This allows selection of transmission parameters and scheduling of transmissions, for example to maximize throughput metrics. However, knowledge of the channel state which is only available to the terminal can be exploited in accordance with the invention to enable improved timing of transmission of CSI reports which can provide the network with appropriate CSI, but with a lower uplink overhead than periodic CSI and with better selection of transmission timing than for aperiodic reports based only on information available in the network. The potential benefits of reducing the uplink overhead include lower interference to other UL transmissions, lower power consumption by the terminal and less use of UL system resources.

The invention claimed is:

1. A method for use in a multiple-input multiple-output communication network in which:
   the network comprises a plurality of cells provided by one or more base stations operable to transmit signals on at least one downlink to and receive signals on at least one uplink from one or more user equipments,
   a user equipment is operable to feed back to the network reports on channel state information, CSI, relating to one or more channels between the one or more base stations and that user equipment; and wherein
   the one or more base stations are operable to adapt downlink signals to the one or more user equipments based on the CSI reports, the method comprising:
   identifying uplink resources for a user equipment-initiated channel state message;
   the user equipment judging a need for the user equipment-initiated channel state message based on information not available to the network of a change in capabilities of the user equipment including at least one of: number of receiving antennas available, available processing power, and number of transceivers available; and
   if the user equipment judges a need for the user equipment-initiated channel state message, the user equipment sending the user equipment-initiated channel state message to the network using the uplink resources identified.

2. The method according to claim 1 wherein the user equipment-initiated channel state message comprises one or more of:
   a CSI report;
   a request to send a CSI report;
   a request for a change in a rate of CSI reports;
   a request for a change in a mode of CSI reporting;
   a request for a change in transmission mode between the user equipment and the network.

3. The method according to claim 1 wherein said judging is based on a change in channel state of the downlink observed by the user equipment.

4. The method according to claim 1 wherein said judging employs one or more of the following criteria as determined by the user equipment:
   channel matrix;
   channel spatial structure
   signal to interference ratio, SIR, signal to noise ratio, SNR, or signal to interference plus noise, SINR
   transmission rank preferred by the user equipment
   transmission mode preferred by the user equipment;

preferred precoding matrix of the user equipment;
expected data rate;
rate of change of channel state;
function of channel state of two or more times.

5. The method according to claim 1 wherein the identifying comprises the network making resources for the user equipment-initiated channel state message available to the user equipment permanently or for a defined time period.

6. The method according to claim 5 applied to a LTE-based wireless communication system and wherein the resources include one or more of:
   a persistent uplink grant of resources on a physical uplink shared channel, PUSCH;
   a periodic allocation of resources on a physical uplink control channel, PUCCH;
   a grant of resources on a random access channel, RACH on a non-contention basis.

7. The method according to claim 1 further comprising the user equipment requesting resources from the network for sending the user equipment-initiated channel state message, the network identifying the resources in response to such a request.

8. The method according to claim 7 applied to a LTE-based wireless communication system and wherein the request is made using one or more of:
   a CSI message on PUCCH or PUSCH;
   a medium access control layer, MAC, message
   a RACH message.

9. The method according to claim 1 wherein the identifying comprises the network making resources for the user equipment-initiated channel state message available on a contention basis.

10. The method according to claim 3 wherein the user equipment-initiated channel state message comprises a CSI report which is in addition to a CSI report requested of the user equipment by the network.

11. The method according to claim 3 wherein the user equipment-initiated channel state message comprises a CSI report which is instead of a CSI report requested of the user equipment by the network.

12. A user equipment, UE, for use in a multiple-input multiple-output communication network comprising a plurality of cells provided by one or more base stations operable to transmit signals on at least one downlink to and receive signals on at least one uplink from the UE, the UE comprising:
   a memory; and
   a processor coupled to the memory and configured to:
   feed back to the network reports on channel state information, CSI, relating to one or more channels between the one or more base stations and the UE for allowing the one or more base stations to adapt downlink signals to the UE based on the CSI reports;
   identify an uplink resource suitable for a user equipment-initiated channel state message;
   judge a need for the user equipment-initiated channel state message based on information not available to the network of a change in capabilities of the user equipment including at least one of: number of receiving antennas available, available processing power, and number of transceivers available; and
   if a need is judged for the user equipment-initiated channel state message, send the user equipment-initiated channel state message to the network using the available uplink resource.

13. A wireless communication system comprising:
   one or more user equipments, UEs; and
   at least one base station, BS, providing a plurality of cells for multiple-input multiple-output communication with the one or more UEs, the cells operable to transmit signals on at least one downlink to and receive signals on at least one uplink from the one or more UEs, wherein:
   the one or more UEs are configured to feed back to a network reports on channel state information, CSI, relating to one or more channels between the at least one BS and the one or more UEs for allowing the at least one BS to adapt downlink signals to the one or more UEs based on the CSI reports; and
   the at least one BS is configured to adapt downlink signals to the one or more UEs based on the CSI reports;
   wherein the one or more UEs is further configured to:
      identify an uplink resource suitable for a user equipment-initiated channel state message;
      judge a need for the user equipment-initiated channel state message based on information not available to the network of a change in capabilities of the user equipment including at least one of: number of receiving antennas available, available processing power, and number of transceivers available; and
      if a need is judged for the user equipment-initiated channel state message, send the user equipment-initiated channel state message to the network using said uplink resource;
   and wherein the at least one BS is further configured to:
      make available said uplink resource suitable for the user equipment-initiated channel state message;
      receive the user equipment-initiated channel state message on the uplink resource made available; and
      reconfigure the channel in response to the user equipment-initiated channel state message.

* * * * *